United States Patent
Simmonds

(10) Patent No.: US 7,418,039 B2
(45) Date of Patent: Aug. 26, 2008

(54) ADAPTIVE COMMUNICATION

(75) Inventor: Christopher Martin Simmonds, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 536 days.

(21) Appl. No.: 10/384,573

(22) Filed: Mar. 11, 2003

(65) Prior Publication Data

US 2003/0215021 A1    Nov. 20, 2003

(30) Foreign Application Priority Data

Mar. 12, 2002    (GB)    ................................ 0205822.0

(51) Int. Cl.
H04K 1/10 (2006.01)
H04L 27/28 (2006.01)

(52) U.S. Cl. .................. 375/260; 375/295; 375/222; 375/232

(58) Field of Classification Search ................ 375/260, 375/295, 221, 222, 220, 231, 232; 370/203, 370/208
See application file for complete search history.

(56) References Cited

U.S. PATENT DOCUMENTS

| 5,867,478 | A | * | 2/1999 | Baum et al. ................ 370/203 |
| 5,867,528 | A | * | 2/1999 | Verbueken ................... 375/222 |
| 6,373,433 | B1 | * | 4/2002 | Espax et al. ................. 342/368 |
| 6,424,678 | B1 | * | 7/2002 | Doberstein et al. .......... 375/260 |
| 7,248,559 | B2 | * | 7/2007 | Ma et al. .................... 370/208 |
| 2002/0004920 | A1 | | 1/2002 | Cho et al. |
| 2002/0080887 | A1 | * | 6/2002 | Jeong et al. ................. 375/295 |
| 2002/0085653 | A1 | * | 7/2002 | Matsuoka et al. ........... 375/347 |
| 2002/0127982 | A1 | * | 9/2002 | Haapoja et al. ............. 455/130 |

FOREIGN PATENT DOCUMENTS

| EP | 0 785 645 A1 | 7/1997 |
| EP | 0 903 898 | 3/1999 |
| GB | 2 373 973 | 10/2002 |
| JP | 2000-115119 | 4/2000 |
| JP | 2000-236313 | 8/2000 |
| JP | 2001-148676 | 5/2001 |
| WO | WO 01/33761 | 5/2001 |
| WO | WO 01/76110 | 10/2001 |
| WO | WO 02/49305 | 6/2002 |

* cited by examiner

*Primary Examiner*—Phuong Phu
(74) *Attorney, Agent, or Firm*—Oblon, Spivak, McClelland, Maier & Neustadt, P.C.

(57) ABSTRACT

The invention provides a system for analysing a signal received over a channel to determine the channel characteristics. The determined characteristics are then used to divide the sub-carriers up into groups with similar fading characteristics and allocating a pilot channel to each group. The determined pilot allocation scheme is then used for future transmissions across the channel.

36 Claims, 6 Drawing Sheets

ADAPTIVE COMMUNICATION

FIELD OF THE INVENTION

The present invention relates to a multi-carrier or Orthogonal Frequency Division Multiplexing (OFDM) system employing multiple antennas. In particular, the present invention relates to the dynamic allocation of pilot carriers.

BACKGROUND OF THE INVENTION

There are now a number of systems which operate at high data rates such as multimedia applications like Wireless Local Area Network (WLAN); Wireless Personal Area Network (WPAN), e.g. Bluetooth; etc. Various arrangements have been proposed in order to facilitate such high data rates in a reliable and practical way. However, there are a number of problems associated with high data rate wireless channels, particularly due to multipath. This is especially problematic indoors where the environment is particularly dispersive due to the large number of objects and surfaces as well as the dynamic nature of structures, particularly people, moving about. Consequently, it can be extremely difficult to extract and retrieve the original information from a transmitted signal reliably and without extremely complex processing. This results in complex receivers which must be capable of estimating and compensating for the multiple versions of the original signal arriving at the receiver due to the different path length of each version.

In order to counter this, a multi-carrier approach has been proposed in which the original data stream is separated into a series of parallel data streams, each of which is modulated and transmitted with a different frequency, generally within the same band. This allows the relative size of the transmitted symbols relative to the multipath delay to be much larger and so inter symbol interference is reduced. One particularly advantageous system, which utilises multiple carriers is Orthogonal Frequency Division Multiplexing (OFDM).

OFDM is very effective at overcoming the problems of fading and multipath. This is achieved by dividing a frequency selective fading channel (i.e. a channel where the fading characteristics at one frequency are likely to be different to those at neighbouring frequencies such that the profile of the received signal against frequency is not flat) into a number of flat fading sub-bands. In this way, the profile within the sub-bands is approximately flat. These sub-bands relate to the OFDM sub-carrier frequencies.

FIG. 1 shows an example of the layout of a transmitter 10 and receiver 20 for an OFDM system. In the multi-antenna receiving unit 21, each of the antennas receives a signal, which is fed to an analogue to digital converter 22 and then into a serial to parallel converter 23 to separate the individual sub-channels. The sub channels are then processed through a Fast Fourier Transform (FFT) 24. Finally, the signals are converted from a plurality of parallel signals into a serial signal for each sub-channel and the coded data extracted.

In such an OFDM receiver system, it is possible to apply adaptive beamforming weights at various points in a receiver as shown in FIG. 1. However, the effectiveness of these weightings will largely depend on the stability and coherency of the propagation channel. If the channel undergoes flat fading (i.e. the signal strength of each of the sub-carriers is affected to the same extent), then it can be regarded as being a narrowband channel. In this case, a single set of weights can be applied at radio frequency (RF) or intermediate frequency (IF), to the received signal just after the antenna array 21, i.e. at position (1) in FIG. 1. Alternatively, the weights may be applied after the analogue to digital unit 22 at position (2) in FIG. 1. Both of these positions should be sufficient for optimum spatial processing.

However, in wideband systems, operating at high data rates such as WLAN, WPAN, etc., where bandwidths of 10 MHz or higher may be required and/or systems operating in highly dispersive environments, signals will occupy a spectrum in excess of the coherence bandwidth. Consequently, there will be significant variation in the quality/signal strength of the channels across the bandwidth. Consequently, it is unlikely that a single set of weights (i.e. as in narrowband beamforming) would be satisfactory for beamforming.

One way to overcome this problem is to process the received data and apply weightings in the receiver for each sub-carrier, after the FFT 24, i.e. at position (3). FIG. 2 shows an example of a receiver. In this system, the signal is received by antennas 101, 102, 103. Pre-processing units 104, 105, 106, carry out downconversion, A to D conversion, serial to parallel conversion and FFT processing. The outputs are then fed into an array of adaptive signal processing devices 107, 108, 109 which include a plurality of multipliers 110 which multiply each of the received signals by a weighting value w determined by a weight determining unit 113. Each of the weighted signals from the multipliers is then summed 111 to provide an output signal. The output signals from each of the weighting units is then fed to a combining unit 112 which extracts a data signal in which the delayed signals and interference signals have been removed from the received signal.

However, in the example shown, the receiver has L antennas and the number of sub-channels that each antenna receives is N. Therefore, the total number of weighting units required is L×N. This can lead to a very large number of multipliers 110 being required. For example, in the HIPERLAN system, there are 48 data sub-carriers and 4 pilot sub-carriers (N=52); there is also a DC channel (CH0) which does not carry data. This means that the receiver is complicated and this results in the receiver being expensive and potentially subject to reliability problems. In addition, the weighting is normally implemented in software and so processor demand is extremely high, again resulting in high expense or poor performance. If the processing to determine the weighting to be applied is unduly complex, then it may take a significant amount of time to complete. During this time, the channel parameters may have changed significantly and so the calculated weightings could be inappropriate. Under these circumstances, the weighting produced would always out of date and hence poor performance will result where the characteristics of the channel change rapidly with time.

One way to reduce the processor demand, is to divide the operating bandwidth into a number of sub-bands and then select one sub-carrier from within each sub-band on which to base all calculations. This method relies upon each sub-band behaving generally as a narrowband, i.e. that the sub-band effectively undergoes flat fading. In other words the chosen sub-carrier is accurately representative of the fade within the sub-band as a whole. However, without prior knowledge of the operational environment, it is difficult to know to what extent the operating band should be divided up. Where large sub-bands are chosen there is a danger that the chosen sub-carrier would not be sufficiently representative of the sub-band and performance would be degraded. In contrast, if the number of sub-bands is chosen to be large (i.e. few carriers per sub-band), whilst the representative sub-carrier is likely to be accurately representative of the sub-band, the amount of processing required is disadvantageously high.

EP-A2-0,852,407, which relates to current standards for 5 GHz WLANs, suggests reducing the total number of adaptive signal processing units and hence the number of weighting units to improve the receivers by reducing the complexity. The document describes dividing the operating band into four equal sub-bands each having a 'pilot' sub-carrier.

Providing pilot sub-carriers at equal intervals amongst the sub-carriers allows the receiver to calculate the average and differential carrier phase errors. This is achieved by knowing the form of the pilots. Using this information, the receiver can fine-tune the carrier and timing tracking circuits such that errors are minimised.

An example of this arrangement is shown in FIG. 3 where the operating band is divided into fifty-three channels or sub-carriers (i.e. as in HIPERLAN), these are then divided up into four separate groups each defining a sub-band. Each sub-band includes a sub-carrier, which acts as a pilot for the group (in the example, channels −21, −7, 7 and 21). The pilot channels do not carry signal data but contain a predetermined sequence for use in equalising the received signal by comparing the received signal to an expected signal. Weighting for the received signals is determined using the pilot sub-carriers and is then applied to each sub-carrier in the respective sub-band. As indicated above this system relies upon flat fading over each sub-band, which in the case of the above referenced document are of the order of 5 MHz in size.

To aid the coherent demodulation process for OFDM systems, pilot sub-carriers are interspersed between the data sub-carriers at equal intervals. Knowing the form of these pilots, it is possible to calculate the average and differential carrier phase errors, which can in turn be used to fine-tune the carrier and timing tracking circuits in the receiver, such that any errors are minimised.

If the bandwidth of the system is increased such that the sub-bands have considerably greater bandwidth, for example in the region of 10 MHz, then the likelihood that the sub-bands will have flat fading is considerably reduced, particularly where the environment is such as to give strong multipath interference, e.g. indoors. Consequently, the pilot is less likely to provide an accurate indicator for the sub-carriers in the sub-band.

Dynamic allocation of the modulation scheme of sub-carriers has been proposed, for example the Atheros system, to extend the basis of 5 GHz systems to allow a wide range of devices to coexist under a unified protocol. In this way, individual sub-carriers are allocated a modulation scheme according to the existing conditions. In the Atheros system, the highest order modulation scheme possible is allocated to each sub-carrier to maximise throughput. If some of the sub-carriers are experiencing more severe fading, then a lower order modulation scheme can be applied. This reduces the potential throughput but provides a more reliable transfer and so the valid data throughput is maximised.

A further problem associated with this arrangement is that if a pilot channel falls in a frequency slot that is experiencing severe fading, the pilot may be unrecoverable and cannot be used in the calculation of the average and differential carrier phase errors. Consequently, a large portion of the band may become unrecoverable due to the reduced estimation and interpolation between the remaining pilots. FIG. 4 shows an example of a dispersive channel based upon the ETSI 5 GHz HIPERLAN/2 channel models, indicating the approximate spacing and locations of pilots. Of the four pilots, one of the pilots is in a deep fade. Consequently, the receiver may not be able to recover the pilot and therefore the group of channels that rely upon the information from this pilot may also be unrecoverable. Referring back to FIG. 3, it will be apparent that the sub-carriers in group 3 would be unrecoverable due to the loss of the pilot in channel 7.

Application number GB0108026.6 describes a system for rearranging the sub-bands according to the channel characteristics. In this way, the sub-carriers can be dynamically allocated to sub-bands so that all the sub-carriers within a sub-band have similar coherency within a limited period of time.

SUMMARY OF THE INVENTION

The present invention can be implemented either in hardware or on software in a general purpose computer. Further the present invention can be implemented in a combination of hardware and software. The present invention can also be implemented by a single processing apparatus or a distributed network of processing apparatuses. Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

Therefore according to the present invention there is provided a terminal for use with a multi-carrier communication system, the terminal comprising: a pilot allocator for determining pilot allocation information based upon the characteristics of a channel over which a signal is to be transmitted; and a transmitter for transmitting a multi-carrier signal comprising a plurality of sub-carriers wherein one or more of the sub-carriers are allocated as pilot channels based upon said pilot allocation information.

The present invention further provides a terminal for use with a multi-carrier communication system, the terminal comprising: a receiver for receiving a multi-carrier signal comprising a plurality of sub-carriers transmitted over a channel; an analyser for analysing the received signal to determine the channel characteristics; and a pilot allocator for using the channel characteristics to determine pilot allocation information identifying one or more of the sub-carriers to be allocated as pilot channels.

The present invention also provides a method of communication in a multi-carrier communication system comprising: determining pilot allocation information based upon the characteristics of a channel over which a signal is to be transmitted; and transmitting a multi-carrier signal comprising a plurality of sub-carriers wherein one or more of the sub-carriers are allocated as pilot channels based upon said pilot allocation information.

Furthermore, the present invention also provides a method of communication in a multi-carrier communication system comprising: receiving a multi-carrier signal comprising a plurality of sub-carriers transmitted over a channel; analysing the received signal to determine the channel characteristics; and using the channel characteristics to determine pilot allocation information identifying one or more of the sub-carriers to be allocated as pilot channels.

The present invention allows a received signal to be analysed to determine the characteristics of the channel over which it is transmitted. By doing this, the pilots can be selectively allocated to channels which will provide a representative indication of the sub-band which the pilot is acting as pilot to. Furthermore, where the channel is suffering flat fading over a significant number of sub-carriers, the number of pilots in that region can be reduced. Similarly, where the response of the channel is variable, the number of sub-carriers allocated to an individual pilot can be reduced. Thus the pilot can still provide a reasonably accurate indication of the fewer number of sub-carriers which it represents.

Furthermore, by avoiding deeply faded channels, the pilots can almost always be recovered and so the loss of whole groups of sub-carriers, or sub-bands, because the pilot channel is lost can be avoided.

Furthermore, in the HIPERLAN/2 standard, only four pilots are allocated. However, by having dynamic pilot allocation, this number might be reduced where the channel suffers flat fading. Equally, where the channel is highly dispersive, the number of pilots can be increased to allow a better indication of how the channel is affecting all of the sub-carriers. By varying the number of pilots, the throughput can be improved where the channel is flat (by avoiding allocation of resources to unnecessary pilots) and maximised when the channel is dispersive (by avoiding whole groups of sub-carriers being lost because a pilot is not received correctly).

The present invention may operate by determining the channel based on a received signal and assuming that the transmit channel is affected similarly. In this way, the transmitted signal can be optimised (i.e. pilots allocated) based upon the signal which was just received.

Alternatively, when a signal is received, the receiver may determine the characteristics of the channel and then send back information to the transmitter to allow it to optimise future transmissions over that channel. The information may be information about the channel properties, specific pilot allocation information or other information to allow the optimum allocation of pilots for subsequent transmissions from the transmitter to be determined.

Such transmissions of information in an asymmetric channel can be in both directions to allow both receive and send links to be optimised.

The present invention can be used with sub-bands of fixed size and pilot channels allocated appropriately to provide an optimum indication of the channel or more particularly the sub-carriers within the sub-band. The pilots can then be used, for example by interpolating to determine the criteria for receiving an intermediate sub-carrier or group.

However, the present invention can also be used in conjunction with a system in which the sub-bands are dynamically allocated in response to the channel conditions. Thus, if a large number of sub-carriers are suffering flat fading then they can be allocated to one large sub-band and perhaps only one pilot. Equally, where the sub-carriers are experiencing differing fading, then they may be grouped into smaller groups. These smaller groups would again only need one pilot, which should represent the group. In order to determine how many pilots are needed and where they are positioned amongst the sub-carriers, the sub-carriers are preferably grouped into groups of sub-carriers having similar coherency. The grouping means preferably allocates a sub-carrier to a group based upon the coherency of that sub-carrier being within a predetermined amount of the adjacent sub-carriers which have already been allocated to that group. The maximum difference in coherency is preferably within 3 dB of the other sub-carriers of the group. The maximum difference in coherency is also preferably within 0.5 degrees of the other sub-carriers of the group. As indicated above, where dynamic allocation of sub-bands is used, the groups can correspond to the sub-bands. Where the sub-bands are fixed, the groups may be selected and a pilot allocated to each group regardless of the sub-banding. This may result in two or more pilots in one sub-band or even no pilot in some sub-bands. The appropriate information for determining the characteristics of a given sub-carrier can still be determined by interpolating between the pilots.

The system preferably repeatedly monitors the coherency of the sub-carriers within a group to ensure that they continue to remain within a certain range of the other sub-carriers of the group and of the pilot for that group.

The present invention provides a better estimate of the coherency of the sub-carriers and so more effective coherent demodulation can be achieved. This allows higher order modulation schemes (BPSK, QPSK, 8PSK etc.) to be utilised and so higher throughput can be achieved. Furthermore, sub-carriers which suffer little fading can operate with a higher modulation scheme than sub-carriers which are suffering fading.

The present invention can be implemented in a conventional OFDM receiver without significant modification. Consequently, systems can easily be upgraded to operate with this improved system.

Current standards for 5 GHz systems specify a fixed transmission bandwidth (20 MHz raster). However, there are possible future systems which will support higher data rates through allocation of extra channels, e.g. allocating a further 20 MHz to a single link to support up to twice the maximum instantaneous data rate. For example, in the Atheros unified 5 GHz proposal, this would allow up to 108 MBps user data support. The increased bandwidth of these systems means that they may be vulnerable to losing significant numbers of sub-carriers if a fixed pilot cannot be correctly received. The present invention therefore allows the full potential of these systems to be achieved under more circumstances. The flexible allocation of pilots also allows the easy implementation of variable bandwidth systems using multi-carrier or OFDM. This allows a maximisation of throughput in a given channel environment or a reduction in the required bandwidth for a given throughput requirement.

The present invention can be implemented either in hardware or on software in a general purpose computer. Further, the present invention can be implemented in a combination of hardware and software. The present invention can also be implemented by a single processing apparatus or a distributed network of processing apparatuses. Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

BRIEF DESCRIPTION OF THE DRAWINGS

A specific embodiment of the present invention will now be described in detail by reference to the drawings, in which.

DETAILED DESCRIPTION

Figure 5:
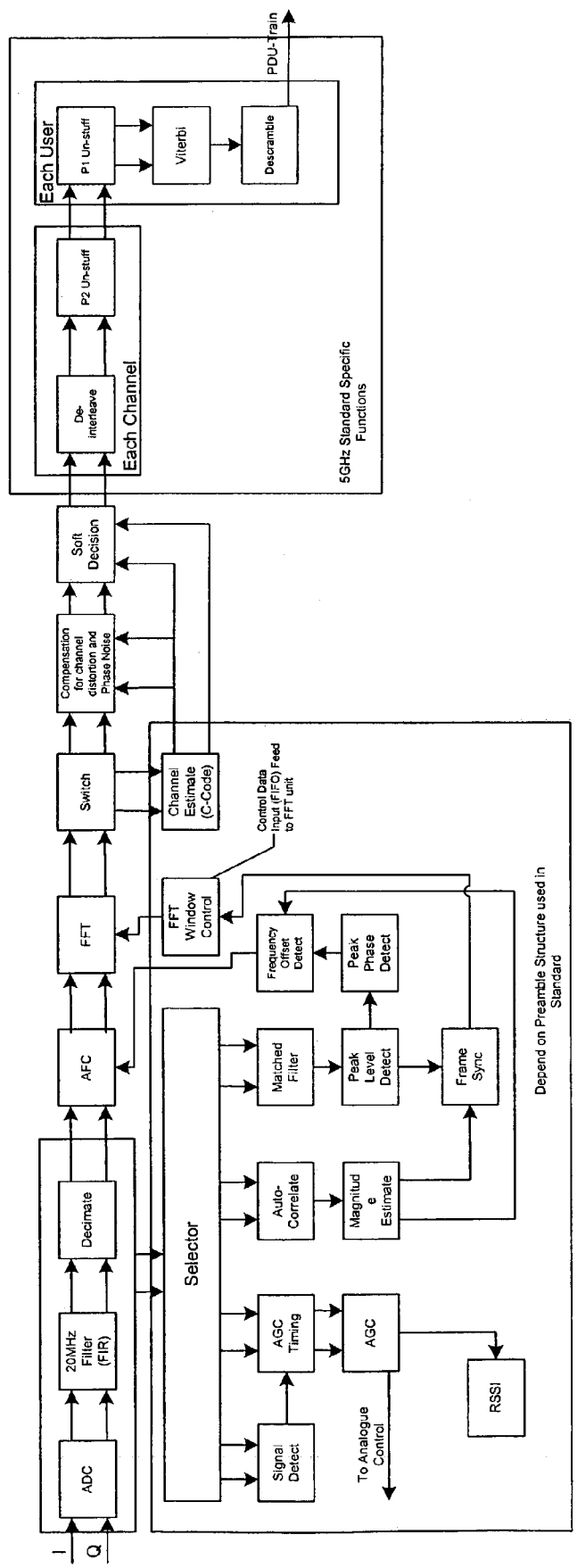
FIG. 5 shows a basic outline of an OFDM receiver of the present invention.

FIG. 5 shows the functional layout of the baseband section of an OFDM receiver used in the present invention. Many of the functions of the receiver shown are well known and so only a brief explanation is given here. The received signal is quadrature (I and Q) downconverted, amplified and filtered (not shown) before being (over-)sampled by the A/D unit. The digital over-sampled signal is then filtered and decimated. The over-sampling of the signal at the start aids the digital filtering process, after which it is then rate reduced to the required/expected sample rate. It is assumed in this case that the system provides for a preamble of some sort in every burst within a frame (MAC frame). In the case of HIPERLAN, each frame comprises a preamble portion that is made up of three basic OFDM symbols denoted here as A, B and C. A and B (or even C) symbols can be observed (recovered) in the time domain (pre-FFT) and used to establish the frame and frequency synchronisation (as well as set the FFT window for the data that follows these symbols) through some correlation process. The automatic gain control (AGC) settings (not shown—prior to ADC) can also be established. It is possible to pass the C symbol through as a complete symbol to the FFT. Knowing what this symbol is in advance (and assuming adequate synchronisation), the channel variation can be estimated on a sub-carrier basis post-FFT. The C symbol would be 'switched' out to estimate the channel compensation (rotation of the symbols in the sub-carriers). However, this same channel estimation could be used in the sub-carrier grouping procedure.

Alternatively, pilots can be selected post-FFT and used to estimate the channel over time. The pilots have known symbols in them and are processed to identify what symbol is received (I' and Q') and what symbol was expected (I and Q). If I'≠I and Q'≠Q then you can calculate the phase rotation and amplitude change required to make them equal. The pilots provide estimates of these values so that it is possible to estimate or interpolate the amplitude and phase rotation required for all the intermediate sub-carriers. This is known as a one-tap equalisation, which is a simple if not crude way to determine the correction, needed for all the channels. The determined value of the sub-carrier's amplitude and rotation (I and Q) correction value can then be applied. The remainder of the system carries out the unpacking and unscrambling of the data to the relevant bits.

It should be noted that the preamble symbols are there for 'training' or synchronisation purposes i.e. they are known at the receiver so that it can form an estimate of the influences of the channel for an equaliser or even smart antenna weight calculation.

Figure 6:
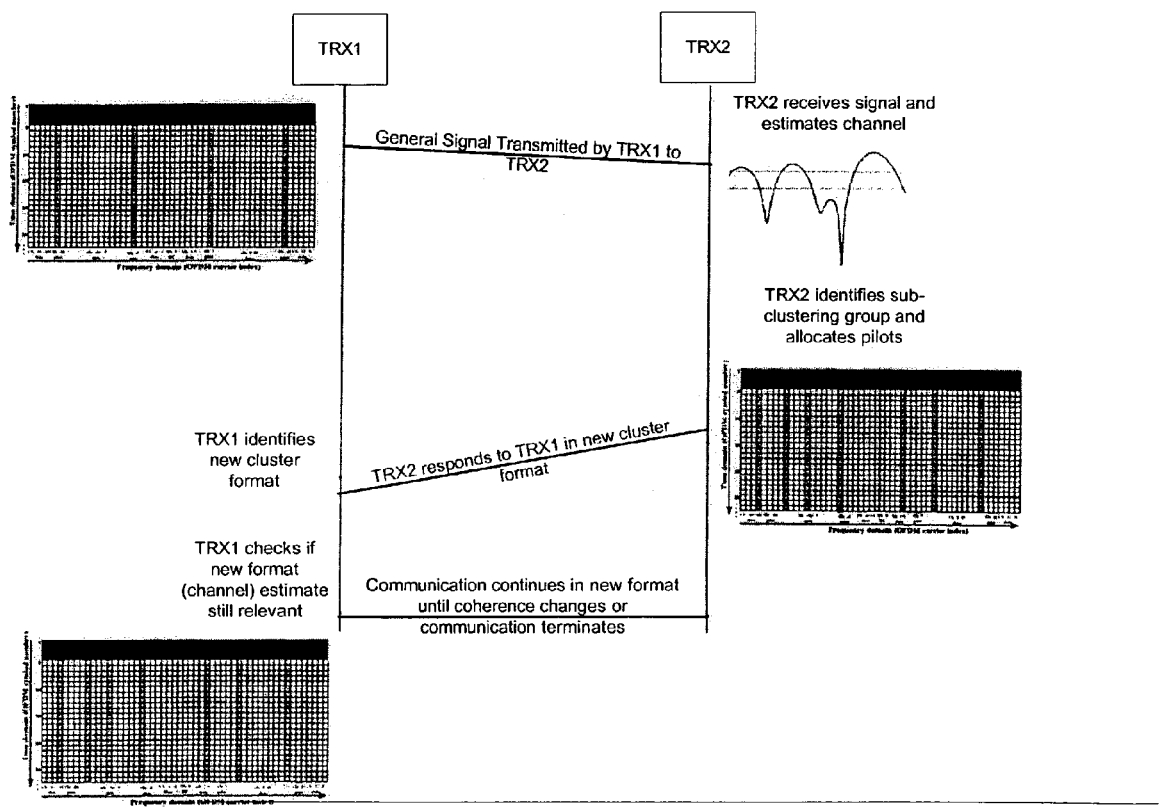
FIG. 6 shows an outline of a dynamic pilot allocation process according to the present invention.

The basic operation of the receiver system will now be described with reference to FIG. 6. Data is transmitted in blocks of data known as symbols. These symbols typically comprise a guard interval for reducing inter-symbol interference as well as a useful data part. Each symbol is transmitted on a sub-channel using the sub-carriers referred to above. The data to be transmitted is divided up into symbols, which are then sent on each of the sub-channels and re-constructed at the receiver. In addition, the series of symbols transmitted generally include one or more preamble symbols, as indicated above, for providing control and synchronisation information etc.

Figure 1:
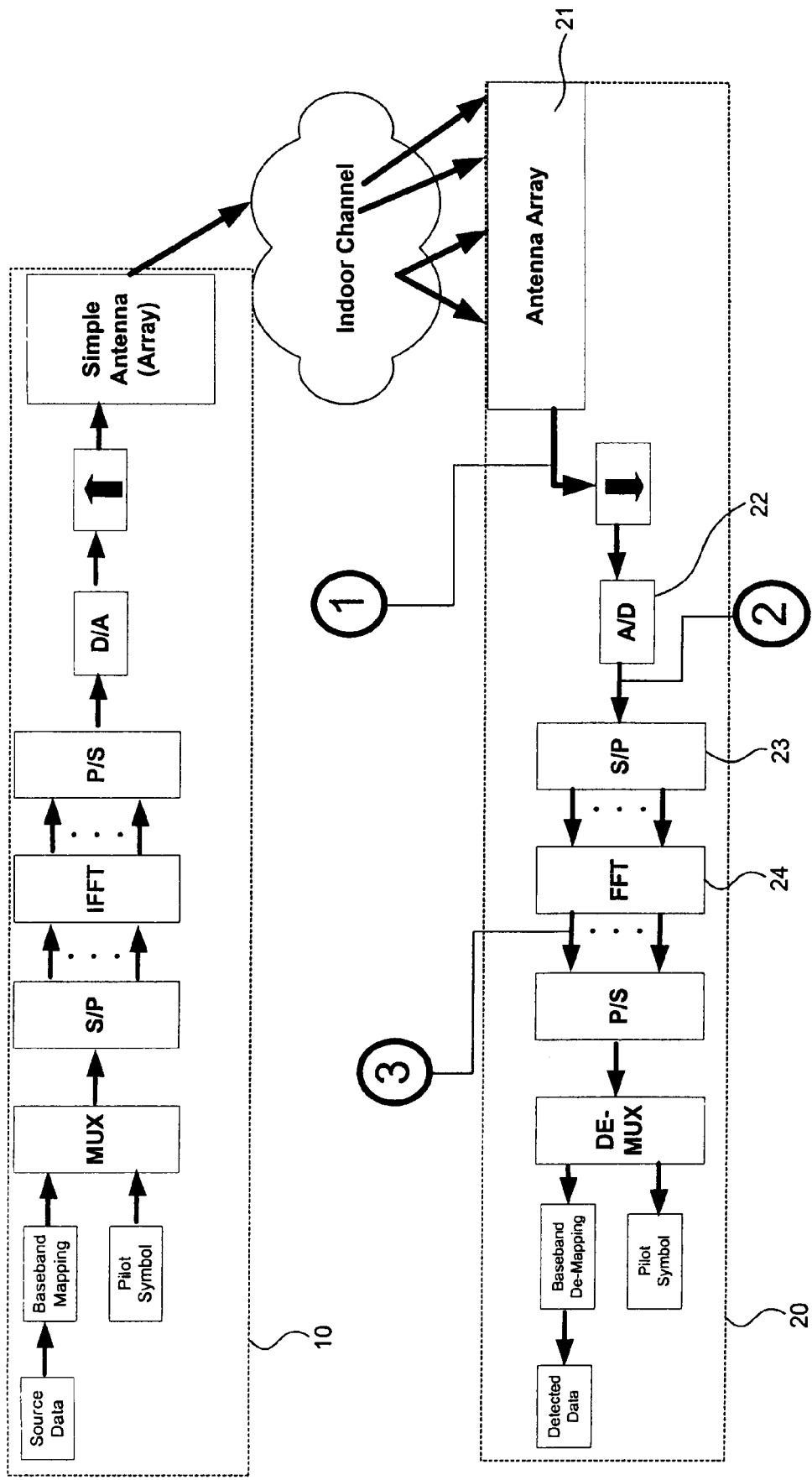
FIG. 1 shows an overview of a typical OFDM receiver.
Figure 2:
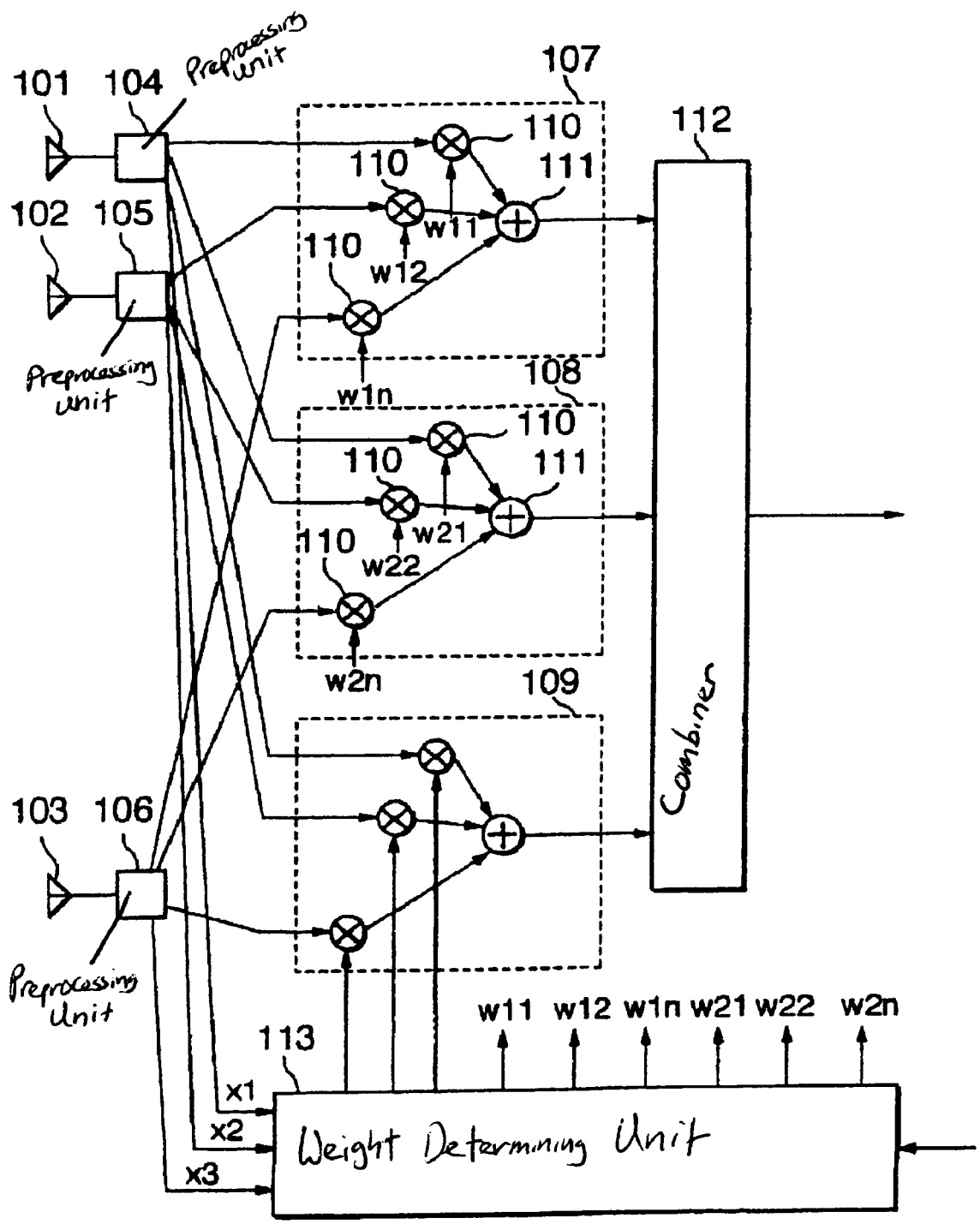
FIG. 2 is a schematic diagram showing the structure of a conventional adaptive antenna system.
Figure 3:
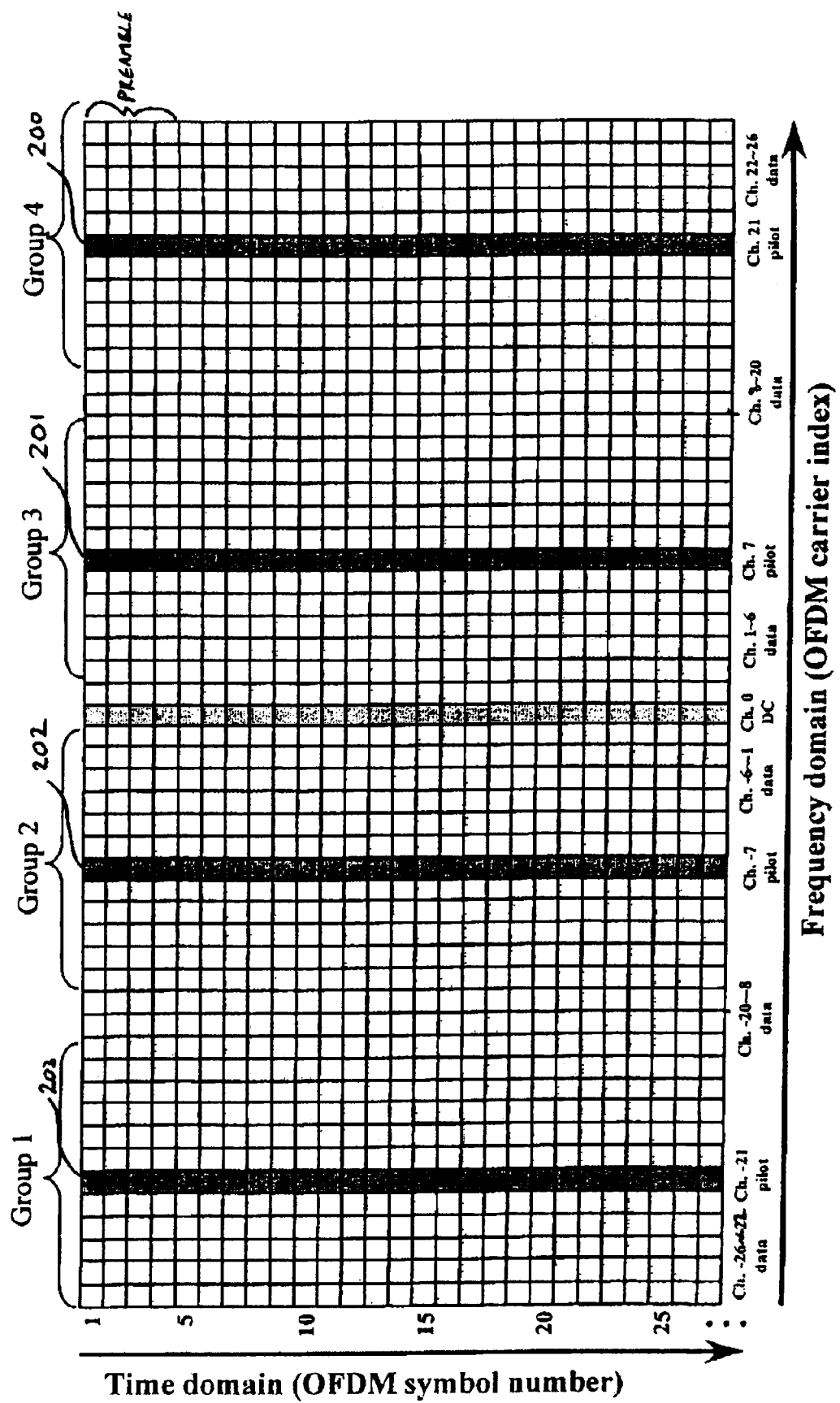
FIG. 3 shows a representation of a system in which the operating channel is divided into sub-bands of sub-carriers.
Figure 4:
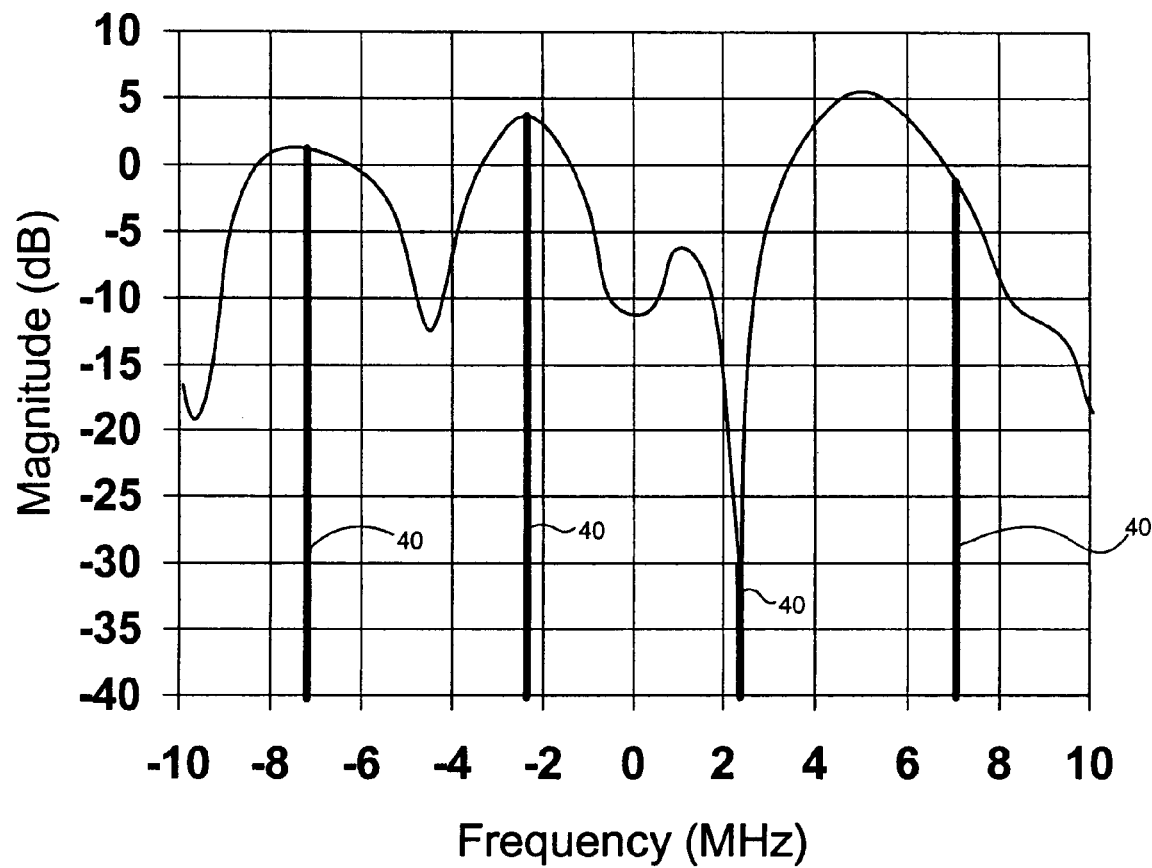
FIG. 4 shows a representation of an exemplary channel characteristic showing deep fading in one pilot sub-carrier.

In this example, communication is taking place between two transceivers TRX1 and TRX2. This could be terminal and base station in a mobile communication system or two terminals in a wireless LAN etc. Initially, a signal would be transmitted by TRX1 in a known format to the receiver TRX2. This format allows the receiver to decode the various aspects of the message, which are important to the basic operation of the connection across an unknown channel, e.g. a broadcast message or other training burst. The receiver TRX2 uses the format of this message (signal characteristics, preamble, etc.) to determine the state of the channel and estimate the coherence bandwidth. The receiver thus determines an estimate of the variation of the fading across the entire band (such as that shown in FIG. 4) using the preamble symbol, in the frequency domain. An estimate of the band is obtained in quadrature (I and Q) information. The 'flatness' of the received power across the sub-carriers and phase differences can be obtained.

It may also be possible to estimate the coherence time of the channel and use this to estimate the time until the determined pilot scheme will need to be modified. Where the channel characteristics are changing rapidly, it will be necessary to re-asses the pilot allocations more often than if the characteristics are stable of a relatively long period of time.

From the estimate, the receiver divides the sub-carriers across the band into groups of sub-carriers. The sub-carriers are grouped with other sub-carriers that are within a certain range of each other. The received power and phase differences do not have to be absolutely equal but just sufficiently close to be within a certain range. The range may be varied depending upon the circumstances. By making the range small, the groups of sub-carriers will be small but very coherent. In contrast, if the range is large, the groups can be much larger but they would generally be less coherent. The range is therefore selected according the available processing power, required reception quality and so on. If there are a lot of small groups and a pilot is allocated to each group, then the data throughput may be reduced because a large portion of the transmitted data would be allocated to pilots and the pilots do not carry user data. A typical value for the range could be that if sub-carriers are within 3 dB of received power and 0.5 degrees of variation.

The pilots are then allocated by selecting one of the sub-carriers within a determined group. The pilot may be selected as the most representative of the other sub-carriers or more simply as the central one of the group or one of the edge members of the group.

TRX2 then utilises the determined pilot scheme to transmit data back to TRX1. This assumes that the transmission takes place within the determined coherency time. As the system helps to ensure more reliable estimation of the coherency, TRX2 may now be able to transmit using a higher order modulation scheme on some sub-carriers than was possible if a fixed pilot scheme was being used. This allows greater data throughput in some or all of the sub-carriers.

TRX1 receives the signal from TRX2 in the new format. The location of the pilots can be determined in TRX1 in a number of ways. The location of the pilots can be signalled through a robust channel message, e.g. coded using BCH. Alternatively, an indication that the pilot channels have been moved could be sent and a blind estimation carried out by TRX1. This does involve a degree of latency at TRX1 but is suitable for non time critical data or where there is a high processing capability. For example, the allocation of the pilots by using knowledge of the pilot channel content e.g. through a correlation or matched filter process in the frequency domain of the receiver, higher order statistical analysis, etc.

Once both TRX1 and TRX2 are aware of the pilot allocation, communication can proceed as normal. The coherency of the groups is periodically monitored to ensure that they remain within predetermined limits. The coherency may be checked to ensure that the members of the group are still within the range of values used to determine the groups initially and also that the selected pilots are still appropriate. Alternatively, the range may be slightly larger to allow some decrease in the coherency (to avoid a very small reduction in coherency precipitating a complete re-assessment of the groupings). If the coherency of any of the sub-carriers in a group is below a predetermined level, then all the groups are re-assessed as above and the sub-carriers reallocated to a new set of groups. If the representative pilot sub-carrier of a group is no longer representative then the pilot might be re-assessed or all the groups may be re-assessed. Alternatively, rather than re-assess all the groups, if only one group is out of range or one pilot is no longer representative of the group, then it may be possible to divide only that group into two or more new groups which in themselves are sufficiently coherent. Then new pilots can be allocated to each new group. Although this increases the number of groups, that may be acceptable as an interim measure to avoid having to re-assess all of the groups.

The number of pilots is variable but it is clearly desirable to provide enough pilots to allow reliable coherent demodulation of the data given a channel dispersion/fading estimate. Equally the number of pilots should not be excessive so that throughput of user data on the remaining sub-carriers is adversely affected despite the possibility of utilising higher modulation schemes.

The arrangement described above assumes that the channel is reciprocal, i.e. the channel is affected similarly in both directions of transmission. However, this may not be the case. Under such circumstances, the determined pilot allocation scheme may be optimised for transmission from TRX1 to TRX2 but not be optimum for transmission from TRX2 to TRX1. Therefore, the present invention also provides for a system where teach of the terminals TRX1, TRX2 have a separate pilot allocation scheme for transmission to them. This means that after transmitting a test signal, the receiver must transmit back information about the channel or optimum pilot allocation scheme (see above) to the transmitter for future transmissions. In addition, it is necessary for the respective receiver to monitor the performance of the selected allocation scheme to determine whether or not it should be maintained.

The above described system, indicates that pilots are selected on the basis of groups of sub-carriers of similar coherency. However, the pilots may be dynamically allocated in some other way to accommodate limitations in processing performance or efficiency of transmitting pilot information for example. For example, the total number of pilots may be specified and the pilots may be allocated uniformly across the band.

These systems are intended to cover operation over relatively large overall bandwidths. For example, HIPERLAN may operate in the bands 5.15 to 5.35 GHz and 5.47 to 5.725 GHz, so with both these bands it may arise that the channel is extended. However, one set of sub-carriers may be a long way off the next set, in frequency. Consequently, when the groups are being determined it may be necessary to apply some bounding conditions. This avoids the system trying to group together spectrally disparate sub-carriers.

The invention claimed is:

1. A terminal for use with a multi-carrier communication system, utilizing a plurality of sub-carriers, the terminal comprising:
   a pilot allocator for determining pilot allocation information based upon the characteristics of a channel over which a signal is to be transmitted, the pilot allocator comprising a group selector for allocating each sub-carrier to one of one or more groups of sub-carriers and allocating one sub-carrier in each of said groups as a pilot sub-carrier; and
   a transmitter for transmitting a multi-carrier signal comprising a plurality of sub-carriers wherein one or more of the sub-carriers are allocated as pilot channels based upon said pilot allocation information,
   wherein said pilot sub-carrier is allocated such that fading among said plurality of sub-carriers is substantially flat.

2. A terminal according to claim 1, further comprising a receiver for receiving the pilot allocation information from another terminal to which a transmission was previously made.

3. A terminal according to claim 2, wherein the receiver is adapted to extract the pilot allocation information from signal data received from said other terminal.

4. A terminal according to claim 2, wherein the receiver analyses the signal received from said other terminal to determine which of the received sub-carriers are allocated as pilots to determine the pilot allocation information.

5. A terminal according to claim 1, further comprising:
   a receiver for receiving a signal transmitted over said channel; and
   an analyser for analysing the received signal to determine the characteristics of the transmission channel for use by said pilot allocator.

6. A terminal for use with a multi-carrier communication system, the terminal comprising:
   a receiver for receiving a multi-carrier signal comprising a plurality of sub-carriers transmitted over a channel;
   an analyser for analysing the received signal to determine the channel characteristics; and
   a pilot allocator for using the channel characteristics to determine pilot allocation information identifying one or more of the sub-carriers to be allocated as pilot channels, the pilot allocator comprising a group selector for allocating each sub-carrier to one of one or more groups of sub-carriers and allocating one sub-carrier in each of said groups as a pilot sub-carrier,
   wherein said pilot sub-carrier is allocated such that fading among said plurality of sub-carriers is substantially flat.

7. A terminal according to claim 6, further comprising a transmitter for transmitting a multi-carrier signal wherein one or more of the sub-carriers are allocated as pilot channels based upon said pilot allocation information.

8. A terminal according to claim 7, wherein either or both of said transmitted or received multi-carrier signals include signal data representing said pilot allocation information.

9. A terminal according to claim 6, wherein said multi-carrier signal includes signal data representing said pilot allocation information.

10. A terminal for use with a multi-carrier communication system, the terminal comprising:
   a receiver for receiving a multi-carrier signal comprising a plurality of sub-carriers transmitted over a channel;
   an analyser for analysing the received signal to determine the channel characteristics;
   a pilot allocator for using the channel characteristics to determine pilot allocation information, the pilot allocator comprising a group selector to allocate each sub-carrier to one of a plurality of groups of sub-carriers and determine one sub-carrier in each of said groups as a pilot sub-carrier;
   a transmitter for transmitting a multi-carrier signal wherein one or more of the sub-carriers are allocated as pilot channels based upon said pilot allocation information; and
   a controller for controlling the group selector to establish coherency of the sub-carriers within each group to determine if a difference between a coherency of the pilot sub-carrier and that of the other sub-carriers of the group is below a predetermined amount.

11. A terminal according to claim 10, wherein said group selector is adapted to allocate a sub-carrier to a group based upon the coherency of the sub-carrier.

12. A terminal according to claim 11, wherein said group selector determines the coherency of each sub-carrier.

13. A terminal according to claim 10, wherein said group selector determines the coherency of each sub-carrier.

14. A terminal according to claim 10, wherein the controller is adapted to re-assign the sub-carriers in a group into new groups and determine new pilot sub-carriers to said new groups if it is determined that the difference between the coherency of each pilot sub-carrier and the other sub-carriers of the group is below a predetermined amount.

15. A terminal according to claim 14, wherein the coherency measurement is based upon received power and/or phase difference.

16. A terminal according to claim 10, wherein the coherency measurement is based upon received power and/or phase difference.

17. A terminal according to claim 10, wherein said predetermined amount is 3 dB for the received power and/or 0.5 degrees for the phase difference.

18. A method of communication in a multi-carrier communication system utilizing a plurality of sub-carriers, the method comprising:
   determining pilot allocation information based upon the characteristics of a channel over which a signal is to be transmitted;
   assigning each sub-carrier to one of one or more groups of sub-carriers;
   allocating one sub-carrier in each of said groups as a pilot sub-carrier, wherein said pilot sub-carrier is allocated such that fading among said plurality of sub-carriers is substantially flat; and
   transmitting a multi-carrier signal comprising a plurality of sub-carriers wherein one or more of the sub-carriers are allocated as pilot channels based upon said pilot allocation information.

19. A method according to claim 18, further comprising receiving the pilot allocation information from another terminal to which a transmission was previously made.

20. A method according to claim 19, wherein the pilot allocation information is extracted from signal data received from said other terminal.

21. A method according to claim 19, further comprising analysing the signal received from said other terminal to determine which of the received sub-carriers are allocated as pilots in order to obtain the pilot allocation information.

22. A method according to claim 18, further comprising:
   receiving a signal transmitted over said channel; and
   analysing the received signal to determine the transmission channel characteristics.

23. A method of communication in a multi-carrier communication system utilizing a plurality of sub-carriers, the method comprising:
   receiving a multi-carrier signal comprising a plurality of sub-carriers transmitted over a channel;
   analysing the received signal to determine the channel characteristics;
   using the channel characteristics to determine pilot allocation information identifying one or more of the sub-carriers to be allocated as pilot channels;
   assigning each sub-carrier to one of one or more groups of sub-carriers; and
   allocating one sub-carrier in each of said groups as a pilot sub-carrier, wherein said pilot sub-carrier is allocated such that fading among said plurality of sub-carriers is substantially flat.

24. A method according to claim 23, further comprising transmitting a multi-carrier signal wherein one or more of the sub-carriers are allocated as pilot channels based upon said pilot allocation information.

25. A method according to claim 24, wherein either or both of said transmitted or received multi-carrier signals include signal data representing said pilot allocation information.

26. A method according to claim 23, wherein said multi-carrier signal includes signal data representing said pilot allocation information.

27. A method of communication in a multi-carrier communication system comprising:
   receiving a multi-carrier signal comprising a plurality of sub-carriers transmitted over a channel;
   analysing the received signal to determine the channel characteristics;
   determining pilot allocation information including:
   allocating each sub-carrier to one of a plurality of groups of sub-carriers, and
   allocating one sub-carrier in each of said groups as a pilot sub-carrier;
   transmitting a multi-carrier signal wherein one or more of the sub-carriers are allocated as pilot channels based upon said pilot allocation information; and
   establishing coherency of the sub-carriers within each group to determine if the difference between a coherency of the pilot sub-carrier and that of the other sub-carriers of the group is below a predetermined amount.

28. A method according to claim 27, wherein each sub-carrier is allocated to a group based upon the coherency of the sub-carrier.

29. A method according to claim 28, wherein the coherency of each sub-carrier is determined.

30. A method according to claim 27, wherein the coherency of each sub-carrier is determined.

31. A method according to claim 27, further comprising checking the coherency of the sub-carriers within each group to see if the difference between the coherency of the pilot sub-carrier and that of the other sub-carriers of the group is below a predetermined amount.

32. A method according to claim 31, wherein if it is determined that the difference between the coherency of the pilot sub-carrier and that of the other sub-carriers of the group is below a predetermined amount, the sub-carriers in at least that group are re-assigned to new groups and a new pilot sub-carrier are determined for each said new groups.

33. A method according to claim 32, wherein the coherency measurement is based upon received power and/or phase difference.

34. A method according to claim 31, wherein the coherency measurement is based upon received power and/or phase difference.

35. A method according to any one of claims 31 to 34, wherein said predetermined amount is 3 dB for the received power and/or 0.5 degrees for the phase difference.

36. A computer readable storage medium carrying computer readable instructions for controlling a computer to carry out the method of claims 18, 23 or 27.

* * * * *